US011918940B2

(12) United States Patent
Linster

(10) Patent No.: US 11,918,940 B2
(45) Date of Patent: Mar. 5, 2024

(54) DEVICE FOR FILTERING A FLUID, IN PARTICULAR BERNOULLI FILTERING DEVICE

(71) Applicant: Georg Schünemann GmbH, Bremen (DE)

(72) Inventor: Wolfgang Linster, Bremen (DE)

(73) Assignee: Georg Schünemann GmbH, Bremen (DE)

(*) Notice: Subject to any disclaimer, the term of this patent is extended or adjusted under 35 U.S.C. 154(b) by 314 days.

(21) Appl. No.: 17/277,955

(22) PCT Filed: Sep. 20, 2019

(86) PCT No.: PCT/EP2019/075304
§ 371 (c)(1),
(2) Date: Mar. 19, 2021

(87) PCT Pub. No.: WO2020/058467
PCT Pub. Date: Mar. 26, 2020

(65) Prior Publication Data
US 2022/0111316 A1    Apr. 14, 2022

(30) Foreign Application Priority Data
Sep. 20, 2018  (DE) ..................... 10 2018 123 151.2

(51) Int. Cl.
*B01D 35/30*    (2006.01)
*B01D 29/35*    (2006.01)
(Continued)

(52) U.S. Cl.
CPC ........... *B01D 35/303* (2013.01); *B01D 29/35* (2013.01); *B01D 29/56* (2013.01);
(Continued)

(58) Field of Classification Search
CPC ...... B01D 35/303; B01D 29/35; B01D 29/56; B01D 29/6484; B01D 29/68;
(Continued)

(56) References Cited

U.S. PATENT DOCUMENTS 3,948,773 A  *  4/1976  Tucker ............... B01D 24/4869
                                                   210/128
2012/0255915 A1  10/2012  Linster et al.

FOREIGN PATENT DOCUMENTS

DE    3820678 A1   12/1989
DE    3909402 A1    9/1990
(Continued)

OTHER PUBLICATIONS

International Search Report Form PCT/ISA/210 dated Jan. 18, 2021 for PCT/EP2019/075304. Daniel Hilt, Authorized Officer. Two (2) pages.
(Continued)

*Primary Examiner* — Waqaas Ali
(74) *Attorney, Agent, or Firm* — Vorys, Sater, Seymour and Pease LLP; Mark A. Watkins

(57) ABSTRACT

The invention relates to an apparatus (1, 1') for filtering a fluid, in particular a Bernoulli filtering apparatus (1, 1'), comprising: a housing (3, 3'), a plurality of filter elements (55), arranged in the housing (3, 3'), for filtering the fluid, an inlet (5) for admitting fluid to be filtered into the housing (3, 3'), and an outlet (7) for discharging the filtered fluid from the housing (3, 3'). The invention solves the stated problem by providing the housing (3, 3') with a plurality of housing segments (23) which can be connected to adjacent housing segments (23), and by a filter element (55) being arranged at least partially inside each housing segment (23), and by the housing segments (23) and filter elements (55) together forming a modularly assembled filter module (9). The invention also relates to apparatuses of the kind initially specified
(Continued)

Figure 1:
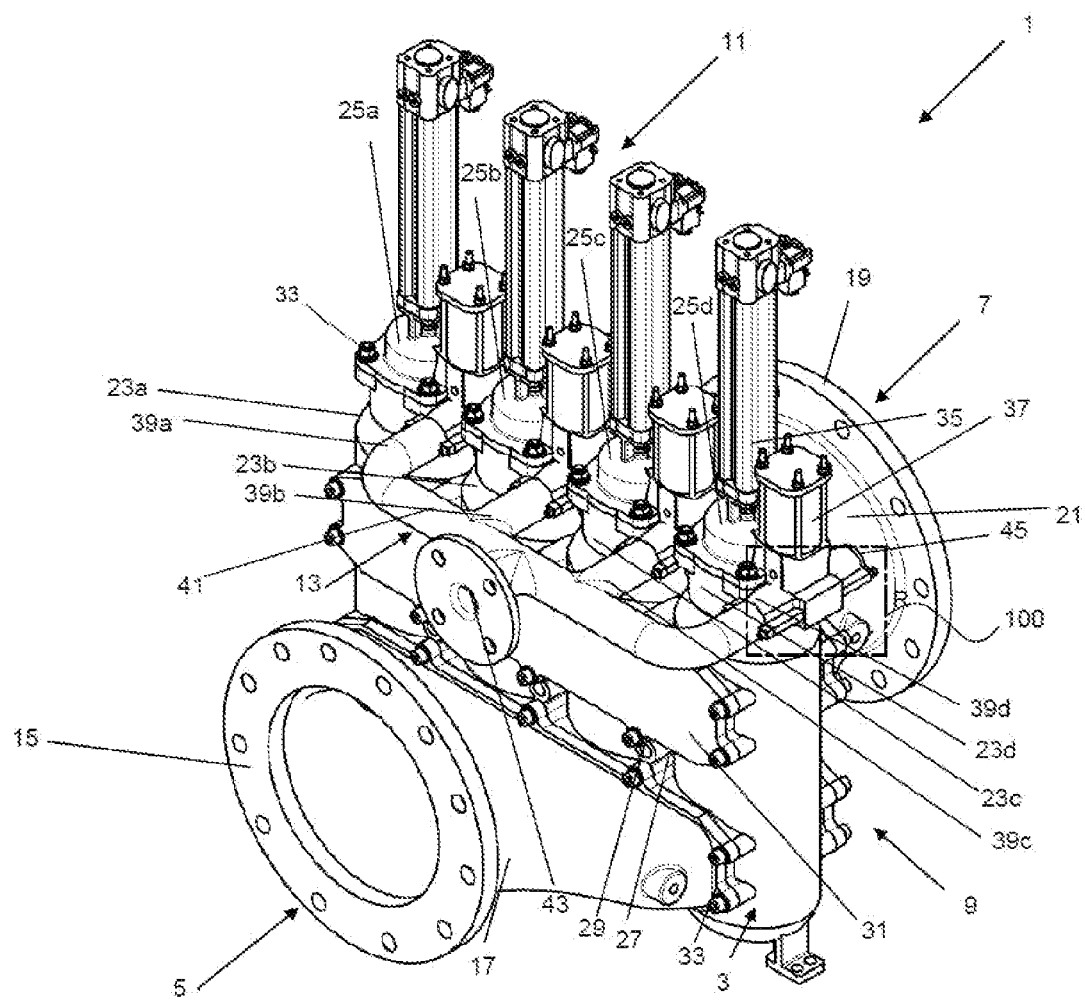

which further comprise: at least one housing cover (25) for closing the housing, at least one filter cleaning mechanism (11) for cleaning the filter element (55) of residues from the filtered fluid, and at least one backflushing system (13, 13') in fluid communication with the filter element (55), for conducting and discharging the residues from the filtered fluid. The invention solves the stated problem by the filter cleaning mechanism (11) being associated with the housing cover (25) and in particular being fixed thereto, and by the backflushing system (13, 13') being associated with the housing (3, 3'), in particular with housing segments (23).

19 Claims, 6 Drawing Sheets

(51) Int. Cl.
    *B01D 29/56*     (2006.01)
    *B01D 29/64*     (2006.01)
    *B01D 29/68*     (2006.01)
    *B01D 35/157*     (2006.01)

(52) U.S. Cl.
    CPC ......... *B01D 29/6484* (2013.01); *B01D 29/68* (2013.01); *B01D 35/1573* (2013.01); *B01D 2201/16* (2013.01); *B01D 2201/34* (2013.01); *B01D 2201/4038* (2013.01)

(58) Field of Classification Search
    CPC ............ B01D 35/1573; B01D 2201/16; B01D 2201/34; B01D 2201/4038; B01D 29/52; B01D 35/16; B01D 36/00
    See application file for complete search history.

(56) References Cited

FOREIGN PATENT DOCUMENTS

| | | | |
|---|---|---|---|
| DE | 19956859 A1 * | 6/2001 | ........... B01D 29/117 |
| DE | 10 2005 055 555 A1 | 5/2007 | |
| DE | 102007054737 A1 * | 5/2009 | ........... B01D 29/117 |
| DE | 102009012444 A1 | 9/2010 | |
| DE | 10 2011 007 003 A1 | 10/2012 | |
| DE | 202015102903 U1 | 9/2016 | |
| EP | 1814643 B1 * | 2/2009 | ............. B01D 29/15 |
| EP | 2508238 A1 | 10/2012 | |
| JP | H5-508801 A | 12/1993 | |
| WO | 91/16124 A1 | 10/1991 | |

OTHER PUBLICATIONS

Examination Report dated Jan. 20, 2023, for European patent application No. 19 863 374.5-1101, 2 pages.
Examination Report dated Mar. 22, 2023, for Japanese patent application No. 2021-540915, 7 pages.
Examination Report dated Jul. 4, 2023, for Japanese patent application No. 2021-540915, 2 pages.
European Search Report dated Sep. 26, 2023, for application No. 23182819.5, 16 pages.

\* cited by examiner

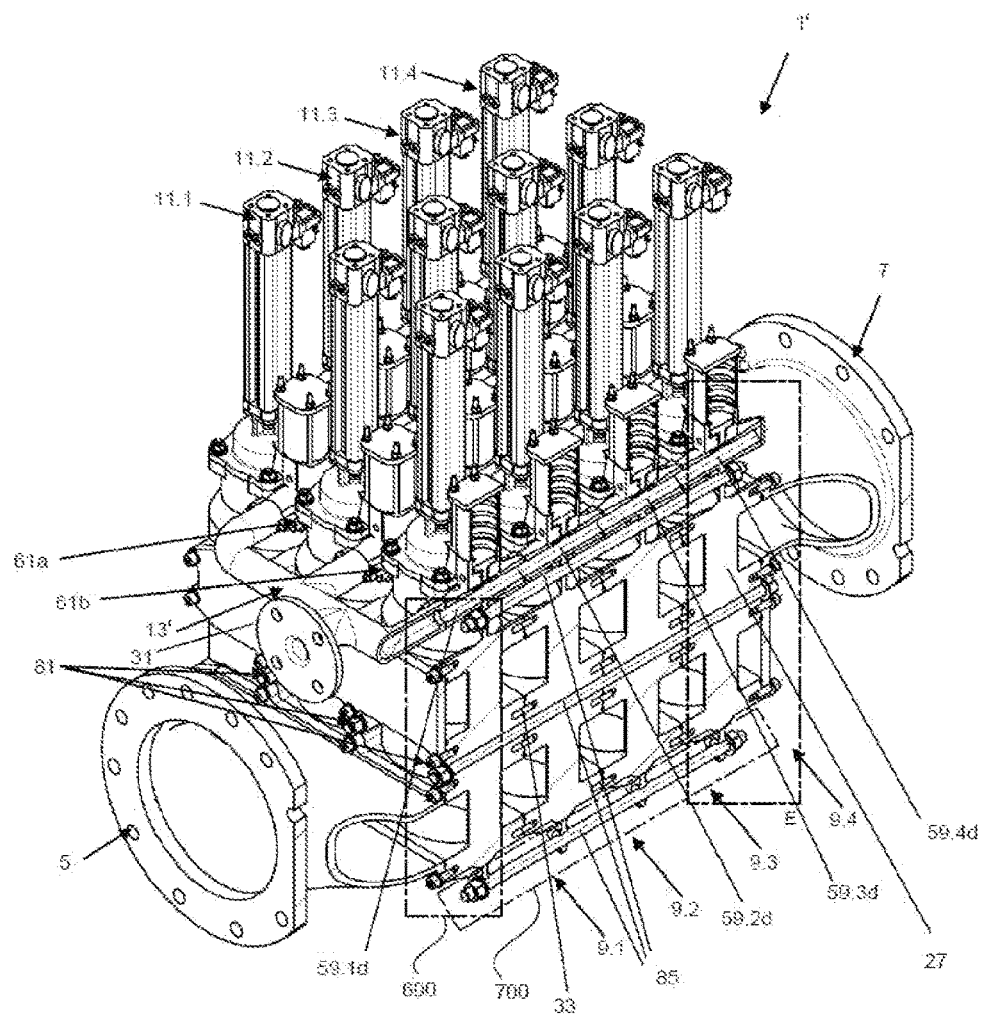
FIG. 8
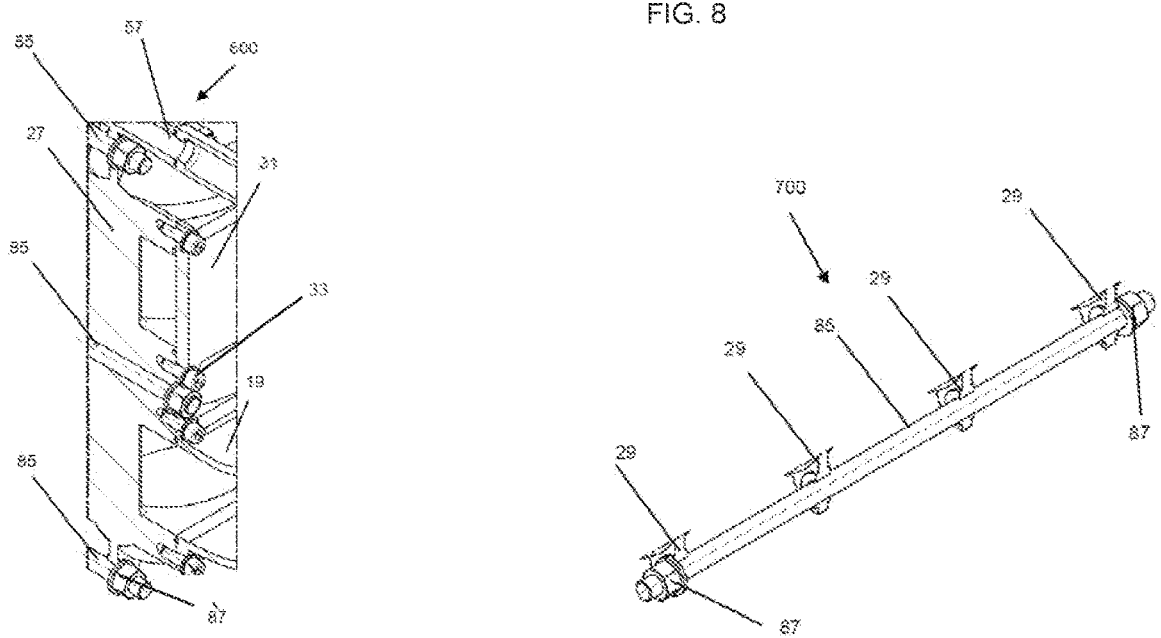
FIG. 9
FIG. 10

DEVICE FOR FILTERING A FLUID, IN PARTICULAR BERNOULLI FILTERING DEVICE

This application is a § 371 United States National Stage filing of International Application No. PCT/EP2019/075304 filed Sep. 20, 2019, which claims priority to German Patent Application No. 102018123151.2 filed on Sep. 20, 2018, which are hereby incorporated by reference herein in their entirety.

The invention relates to an apparatus for filtering a fluid, in particular a Bernoulli filtering apparatus, comprising a housing, a plurality of filter elements, arranged in the housing, for filtering the fluid, an inlet for admitting fluid to be filtered into the housing, and an outlet for discharging the filtered fluid from the housing.

Filtering apparatuses of the kind initially specified are generally known from the prior art. Such a filtering apparatus generally has a housing with an inlet and an outlet and a filter element disposed in the housing. The filter element is normally substantially cylindrical in shape.

Such generic filtering apparatuses preferably also have a filter cleaning element which can be inserted into the filter element along the central axis of the cylindrical filter element. This axial insertion of the filter cleaning element increases the flow velocity in a region of an inner surface of the filter element, due to the narrower cross-section, with the result that substances adhering to the filter element are flushed off and discharged by means of backflush pipes. Such a filter element is thus normally cleaned contactlessly by increasing the flow velocity. Such filtering apparatuses are also referred to as Bernoulli filters.

DE 10 2011 007 003 A1 and DE 10 2009 012 444 A1 disclose, respectively, a filtering apparatus for filtering liquids, and a method for filtering liquids. DE 10 2005 055 555 A1 discloses a filtering apparatus and an apparatus and method for killing living organisms contained in a fluid.

The size of such filtering apparatuses has a decisive influence on the size of the liquid volumetric flow to be filtered. The filtrate throughput is therefore limited, due to restrictions on installation size.

However, restrictions on the size of installations make economic sense, because otherwise production and transport costs would increase disproportionately. Transport and tooling costs increase not only for housings made of fiberglass-reinforced plastic, for example, which often have to be cured in autoclaves, but also for housings which are produced by casting, as well as for the transportation of heavy and bulky steel or cast-iron structures.

In order to service and clean the filters and the filter cleaning elements, it is necessary in most cases to open the housings and pipelines, or the backflush pipes must be dismantled or shut off, which means that operation has to be completely stopped. This dismantling work is very time-consuming in most cases. The resultant downtimes have a negative impact on the throughput rate of the liquid to be filtered.

Such filter apparatuses, Bernoulli filters in particular, are used in many industrial applications, for example in the petrochemical or pharmaceutical industry, the energy industry or also on ships. Maximizing the throughput of liquid filtrate is therefore a matter of special interest. To achieve that purpose, multi-Bernoulli filters combine a plurality of filter elements in a common housing with an inlet and an outlet connected to the housing.

The object of the invention is therefore to address at least one of the aforementioned problems. In particular, a solution is to be proposed that provides a greater filtrate throughput while reducing or keeping constant the production and transport costs. Alternatively, an alternative to prior art solutions is to be provided.

The invention achieves its object with an apparatus having the features of claim 1. The invention proposes, in particular, that the housing have a plurality of housing segments which can be connected to adjacent housing segments, that a filter element be arranged at least partially inside each housing segment, and that the housing segments and filter elements together form a modularly assembled filter module.

According to the invention, the filter module can thus comprise not only a plurality of housing segments which combine to form a housing and which each have a large filter element, but also a plurality of filter elements arranged inside the housing segments. The throughput that can be achieved is thus increased, and transport and production costs are reduced. By segmenting the housing, the housing can be adapted to the available installation space, and production-related restrictions on installation size do not reduce the volumetric throughput, as individual housing segments can be produced independently of each other.

It is understood that a filter element arranged at least partially inside a housing segment may also include components, such as filter cleaning elements, which are disposed outside the housing.

Such a modularly assembled filter module may comprise one or more filters and can thus be adapted in a versatile and customer-specific manner. The filter module is preferably sealed in a pressure-tight and media-tight manner. The individual housing segments of a filter module can be permeated in parallel by liquid to be filtered, or also successively in a row.

A plurality of filter modules are preferably connected in series adjacent to one another, and a filter module is fluidically connectable to at least one adjacent filter module.

It is thus provided that adjacent filter modules can be connected to one other like a series or parallel circuit, i.e. are evenly positioned behind or beside one another, such that they form an apparatus for filtering a fluid, said apparatus consisting of a plurality of filter modules.

According to a preferred embodiment of the invention, a plurality of filter modules are arranged in a row between an inlet and an outlet in such a way that the housing segments of the filter modules are arranged like a battery, wherein the housing segments are substantially the same or identical in design.

It is thus provided that the liquid to be filtered is distributed evenly in the housing segments, which are arranged like a battery and thus preferably and evenly in two spatial directions, is filtered in each respective filter element and flows through the following series-connected filter elements and/or flows around the filter elements inside the housing. The substantially similar or identical design of the housing segments also provides strong cost-savings potential during their production. The individual housing segments can be manufactured in a casting process, for example, with one and the same casting mold, or with multiple casting molds of identical construction.

Such an apparatus can thus be extended in a versatile manner in two spatial directions. The liquid to be filtered flows not only in parallel but also in series through individual housing segments of a filter module before exiting at the outlet of the apparatus.

Each of the housing segments preferably has at least one fluid inlet for admitting the fluid to be filtered and at least one fluid outlet for discharging the filtered fluid.

Each housing segment thus has at least one fluid inlet for admitting the fluid to be filtered and at least one fluid outlet for discharging the filtered fluid, It is preferable that the fluid inlet and the fluid outlet of a housing segment are vertically spaced apart from each other. The fluid flows into the filter on the "dirty side" of the housing segment and leaves it on the clean side as filtered fluid. The individual volumetric flows through the housing segments, which exit through the outlet port, preferably meet in the process and leave the apparatus as a single volumetric flow.

According to a preferred embodiment of the invention, the housing segments each have at least one through opening which is adapted to distribute and conduct the fluid in and through the filter module.

Through openings are thus provided, through which the fluid to be filtered can flow and thus be distributed on the dirty side of the filter module before it flows through the individual filter elements and leaves the housing segments again on the clean side through respective through openings, and flows around the following housing segments through respective through openings.

A through opening may thus be adapted not only to distribute the filtrate within the filter module before it flows into the individual filter element in the housing segments, but also to conduct the filtered fluid exiting from the filter elements so that it meets the volumetric flows from adjacent housing segments and finally leaves the apparatus as a single volumetric flow of filtered fluid.

Such a through opening according to the invention may be embodied, for example, by the housing segment's fluid inlets and fluid outlets that are not connected to the inlet or outlet.

It is preferable that each of the fluid inlets is fluidically connectable to a fluid outlet of an adjacent filter module or to the outlet, and that each fluid inlet is fluidically connectable to a fluid inlet of an adjacent filter module or the outlet.

The housing segments of identical design, which have a fluid inlet and a fluid outlet, are thus connectable either to two adjacent filter modules or to one filter module and the inlet or outlet.

It is further provided that a single filter module is arranged between the inlet and the outlet and is connected on the outlet side to the fluid outlet and on the inlet side to the fluid inlet, such that the liquid to be filtered flows through only a single filter module.

The invention is advantageously developed by at least one seal member for sealing the ends of the housing segments of a filter module arranged on the inlet side and/or the outlet side, wherein the seal member is adapted to seal the fluid inlets or the through opening of a housing segment, respectively.

The through openings of the individual housing segments, for example of a filter module coupled on the outlet side to the outlet, are thus sealed by the seal member. This allows housing segments of identical design to be used inside a filter module, regardless of how the filter module is arranged inside the apparatus. Thus, if a filter module is arranged at one end, i.e. at the inlet or the outlet, no use is made of the fluid inlets or the through openings, respectively, as these are connected neither to the inlet or outlet, nor to an adjacent housing segment of an adjacent filter module. The seal member is thus adapted to close these fluid inlets or through openings in a fluid-tight manner.

According to a preferred embodiment of the invention, the housing segments are cylindrical in shape, at least in sections, and the filter elements have a substantially round cross-section.

The outer cylindrical surface of the cylindrical filter element thus forms the effective surface of the filter element.

The housing segments are thus pressure-optimized in design, in sections at least. This is advantageous because high pressures may arise in the filter modules due to thermal or also process-related influences or steps. The round cross-sections also allow residues to be removed more easily from the filters and thus result in uniform filtration of the fluid flowing through.

Supporting structures designed to reinforce the housing segments are preferably formed between the housing segments of a filter module.

Due to the formation of supporting structures, preferably in the end regions of the housing segments, sections of the latter are reinforced in such a way that they are pressure-optimized and can thus achieve high volumetric throughputs and process pressures. An ideal pressure vessel is substantially round in shape. Due to the cylindrical design in some regions and in particular to the reinforcement of the peripheral regions, such a housing segment behaves in a similar way to an idealized pressure vessel.

The invention is advantageously developed by a filter module coupling unit for fixing and coupling two or more filter modules, comprising at least one coupling means which is adapted to couple adjacently arranged filter modules to one another, and at least one fixing means associated with the coupling means, which fixing means is adapted to fix the adjacently arranged filter modules in their positions.

The individual filter modules are connected to each other by such a coupling unit, in particular in a force-fitting manner. Such a coupling unit is preferably adapted to couple adjacently arranged filter modules to one another, so that any number of filter modules can be combined can be combined to form an apparatus in accordance with the customer's specific wishes. The coupling unit can be designed as a wire cable, a tie rod, a threaded rod with an internal or external thread, or a loop. A fixing means preferably fixes the individual filter modules relative to each other and to the coupling means in such a way that they can be fixed to the coupling means with precise positioning. Such a fixing means is understood to be not only a mechanical form of fixing, such as a nut, but also a chemical and physical form of fixing, such as an adhesive or a material-fitting connection between a filter module and the coupling means.

According to a preferred embodiment of the invention, at least one coupling means, preferably three vertically spaced-apart coupling means are associated with each housing segment, which coupling means can be brought into engagement at their ends with the fixing means, wherein the coupling means are designed as rods.

Each housing segment is thus assigned a coupling means, so the forces acting on the adjacently arranged filter modules are distributed among the individual housing segments that are connected by means of the coupling means. It is particularly preferable in this regard that a plurality of vertically spaced-apart coupling means are provided, for example three, so that the force acting on the individual housing segments is distributed over the height of the housing segment.

An operationally and constructively simple solution is to use, as the coupling means, a rod which can be brought into engagement at its end with the fixing means, like the way a nut is brought into engagement, for example, so that the individual housing segments of a filter module can be coupled force-fittingly to the housing segments of adjacent filter modules. The fixing means can be easily detached again, so that the apparatus can be modularly extended if the need arises.

The housing segments preferably have receptacles for the coupling means, which are embodied to match the coupling means and which are preferably embodied as receptacles through which the rods are guided.

Due to the receptacles for the coupling means formed in the housing segments, the coupling means can be easily integrated into the apparatus, even when there is limited installation space. The variety of components is also reduced, which is also advantageous from the economic perspective. A plurality of filter modules can thus be connected to each other by means of the coupling means and are oriented relative to each other by the coupling means, thus facilitating assembly and in particular the connecting of the individual filter modules to each other.

The inlet preferably includes an inlet flange for connecting to a pipeline and a pipe section on the inlet side for connecting to the housing segments, and the outlet preferably includes an outlet flange for connecting to a pipeline, and a pipe section on the outlet side for connecting to the housing.

Pipelines that either conduct the fluid to be filtered to the filtering apparatus, or receive the fluid filtered by the apparatus and conduct it further, can thus be connected to the apparatus easily by a flange connection.

The housing segments and thus the filter modules can also be designed independently of the pipe systems in place at the end user. The apparatus can be connected to the pipe system in a simple manner by designing the inlet flange and outlet flange accordingly.

The pipe section on the inlet side is preferably designed to match the pipe section on the outlet side, and the inlet flange is preferably designed to match the outlet flange.

By designing the inlet flange to match the outlet flange, the pipelines of such a pipe system can be connected to the apparatus at their ends in a simple manner.

The variety of components and consequently the production costs are thus reduced.

The pipe sections preferably have a first cross-sectional area on the filter module side and a second cross-sectional area on the flange side, and the center of the cross-sectional area on the flange side is preferably spaced apart vertically and/or horizontally from the center of the cross-sectional area on the filter module side.

The filtering apparatus thus operates inline, which means that the apparatus can be integrated into an existing pipe system by removing a part of the pipe system and inserting the filtering apparatus at the appropriate place.

It is particularly preferable that the outlet of the housing is arranged coaxially with the inlet. The inlet and the outlet of the filtering apparatus are thus arranged coaxially with each other, so the filtering apparatus can be easily installed inline in an existing pipeline.

The respective pipe section on the inlet or outlet side is designed in such a way that it connects the opening of the filter module, which is formed by the individual fluid inlets of the housing segments and may have an oval or angular cross-section, for example, to the inlet flange, which can be connected to the pipeline. The same applies to the flange on the outlet side and to the respective fluid outlets of the housing segments.

The inlet flange and the outlet flange may preferably be designed in accordance with DIN or ASME or other standards, and can thus be easily connected to an opening of the filter module, however that opening is designed.

Even in the case of fluid inlets and fluid outlets arranged vertically in the housing segments, the apparatus can thus be connected to pipelines in such a way that any differences in height can be compensated by the centers of the cross-sectional area on the filter module side and the cross-sectional area on the flange side being vertically spaced apart.

The distance between the center of the cross-sectional area on the flange side and the cross-sectional area on the filter module side can preferably be changed in the vertical and/or horizontal direction by rotation about a horizontal axis.

In this way, the vertical and horizontal position of the inlet flange and the outlet flange can thus be individually adjusted to circumstances at the installation site. Therefore, an apparatus according to the invention can also be integrated in pipe systems which extend at different heights or which have sections spaced horizontally apart. Installation is thus made advantageously more flexible.

The invention is advantageously developed by a filter cleaning mechanism for cleaning the filter elements of residues from the filtered fluid, comprising at least one movably mounted filter cleaning element which is embodied to match a respective filter element and is adapted to clean the filter element of residues from the filtered fluid, and a backflushing system in fluid communication with the filter elements, for conducting and discharging the residues from the filtered fluid.

If the liquid to be filtered now flows through the filter element, in the axial direction, this liquid must flow between an inner surface of the filter element and the filter cleaning element, thus causing a strong local increase in flow velocity and a strong local reduction in pressure. Particles adhering to the inner surface of the filter element that have been filtered out of the liquid are detached as a result, thus cleaning the filter element. This is also referred to as the Bernoulli effect. This type of cleaning is particularly advantageous, in that the filter element is thus cleaned particularly gently, due to cleaning being done contactlessly.

The invention is advantageously developed by a lifting device comprising an actuator and a lifting rod coupled to the filter cleaning element, wherein the lifting device is adapted to introduce the filter cleaning element into the filter element by means of the lifting rod in such a way that a cleaning gap is formed between an inner wall of the filter element and the filter cleaning element, so that a flow velocity of the liquid to be filtered is locally increased and substances in the filter element (55) are flushed off.

Such a lifting device can be embodied in hydraulic, pneumatic, electrical, electromagnetic or in some other form. Alternatively, or additionally, it may have a cable pull system or similar for axially inserting the lifting rod into the filter element. The filter can thus be cleaned contactlessly and fully automatically.

The backflushing system preferably also includes a backflush outlet for discharging the residues from the filtered fluid, a plurality of backflush pipes for fluidically connecting adjacent filter modules, and a connecting pipe for fluidically connecting the backflush pipes to each other and to the backflush outlet.

If a filter element has been cleaned using the filter cleaning element, the liquid in the filter element is loaded particularly heavily with particles (retained particles), so it is advantageous to conduct this heavily contaminated liquid through backflush pipes and to remove them from the apparatus by means of a backflush outlet. In this way, the filter elements are not recontaminated immediately and can continue to be used effectively for filtering.

By connecting adjacent filter modules by means of a connecting pipe, a common backflush outlet can be used, which makes it particularly easy to remove the backflushed liquid from the apparatus.

The backflush pipes are preferably spaced apart and arranged substantially parallel to one another and the backflush pipes each have at least one pipe segment which can be shut off and which has a backflush connector that can be shut off, wherein each pipe segment is connected to a filter module housing segment arranged, in particular, in series and adjacent to one another.

This allows a compact design to be realized, and housing segments arranged like a battery can be connected to each other by such a system of backflush pipes. By shutting off individual backflush connectors associated with a pipe segment, the housing segments can be selectively connected to the outlet of the apparatus by means of the backflush pipes in order to remove the residues of the cleaned fluid from the apparatus.

According to a second aspect of the invention, the stated object is achieved by an apparatus having the features of claim 12. The invention proposes, in particular, that in apparatuses of the kind initially specified, which further comprise at least one housing cover for closing the housing, at least one filter cleaning mechanism for cleaning the filter element of residues from the filtered fluid, and at least one backflushing system in fluid communication with the filter element, for conducting and discharging the residues from the filtered fluid, that the filter cleaning mechanism is associated with the housing cover and in particular is fixed thereto, and that the backflushing system is associated with the housing, in particular with housing segments.

This makes it significantly easier to access the filter elements and the filter cleaning elements for cleaning and maintenance purposes. The housing cover can thus be easily removed from the housing without parts of the backflushing system, for example, having to be dismantled. Downtimes due to maintenance and installation can thus be minimized, and the volumetric throughputs of filtered liquid can be substantially increased for such an apparatus. By shutting off individual pipe segments, it is possible, for example, to service the filter elements selectively so that downtimes are avoided.

Furthermore, when the filter and the filter cleaning mechanism are serviced and cleaned, no damage is caused to the backflushing system as a result of dismantling, which would then result in damage to the apparatus and thus in downtimes. The filter cleaning mechanism, which is associated with the housing cover, can thus be removed and serviced together with the latter. At the same time, the filter element is easy to access and can be replaced or cleaned if necessary. The maintenance effort is substantially reduced on the whole.

According to a preferred development of the invention, the filter cleaning mechanism further comprises a filter cleaning element integrated in the housing cover, wherein the filter cleaning element is insertable into the filter element and is adapted to clean the filter element of residues from the filtered fluid.

Such a filter cleaning element does not affect the filter element when the fluid flowing through the filter element is being cleaned, thus reducing the filtered throughput of the respective filter element. Integrating the filter cleaning element in the housing cover simplifies its installation, such that only the housing cover has to be connected to the respective housing segment. This eliminates the need for installation steps to be carried out at the customer, thus making it easy to access the filter cleaning element in order to clean it.

The invention is advantageously developed by the filter cleaning mechanism further comprising: a lifting device having an actuator and a lifting rod which is coupled to the filter cleaning element, wherein the lifting device is adapted to introduce the filter cleaning element into the filter element by means of the lifting rod in such a way that a cleaning gap is formed between an inner wall of the filter element and the filter cleaning element, so that a flow velocity of the liquid to be filtered is locally increased and substances in the filter element are flushed off.

Such a lifting device utilizes the advantages of lifting devices for filter cleaning mechanisms, as described in the foregoing.

The lifting device is preferably associated with the housing cover, and the actuator, in particular, is securely connected to the housing cover, and an opening is provided in the housing cover for the lifting rod to pass through.

The lifting device, which can be selectively operated pneumatically, electrically or hydraulically, is thus spaced apart from the pipe system and the flow path of the fluid to be filtered. Damage to the lifting device as a result of leaks can therefore be largely prevented. Associating the lifting device with the housing cover provides for easy maintenance of the lifting devices, in particular of the actuator, thus reducing the downtimes due to maintenance work.

According to a preferred development of the invention, the backflushing system further comprises a plurality of backflush pipes for fluidically connecting adjacent filter modules, wherein the backflush pipes each have at least one pipe segment having an outlet which can be shut off, said pipe segment being in fluid communication with the filter element, and wherein a backflush valve adapted to shut off the backflush pipes at least in sections is integrated in the housing cover.

The individual housing segments can thus be connected to the pipe system, and also closed off from it, by means of associated pipe segments and backflush connectors which can be shut off. By integrating a backflush valve in the housing cover, the liquid from inside the housing segment can leave a single housing segment via the housing cover and through the valve seat and can be provided to the respective pipe segment and thus to the pipe system by means of the backflush connector that can be shut off. This means it is not necessary to connect the housing cover itself to the backflush pipe system, but that the housing segment and an associated pipe segment can be connected to and disconnected from each other by means of such a backflush valve.

A backflush valve preferably has a valve housing which is formed by the housing cover, and a valve body which can be brought into contact with a valve seat in order to close the valve is preferably mounted movably on the valve housing.

The highly contaminated fluid can thus flow past the valve seat, which is either shut off or opened by the valve body, through to the backflush outlet so that it can be discharged at the outlet of the apparatus by means of the pipe system. By integrating the valve housing in the housing cover, it is also possible to reduce the variety of components and the number of production steps.

The backflush valve is preferably coupled to a restoring element which is arranged in the housing cover and is configured to apply a restoring force to the valve body in order to hold the valve body in contact with the valve seat.

Such a valve is a fail-safe shut-off means which remains in the closed state even in the event of system failure, so no fluid can escape inadvertently from the apparatus.

It is preferable that a flow channel adapted to connect the filter element fluidically with the backflush pipe is formed in the housing cover, and that the valve body shuts off the flow channel when the valve is closed.

By means of such a flow channel formed in the housing cover, the backflush pipe can be connected to the housing segment with a simple and compact design. When the housing cover is open, no fluid from the housing segment can enter the pipe segment of a backflush pipe, because the flow channel is dismantled along with the housing cover. This means that no further shut-off mechanisms are necessary to prevent any inadvertent escape of fluid.

According to a preferred embodiment, the valve seat is embodied as an aperture which is adapted to change the velocity of the volumetric flow which flows into the backflush pipe.

The flow velocity of the volumetric flow can thus be varied in a simple manner by varying the inner diameter of the aperture that forms the valve seat. The flow velocity of the volumetric flow affects the cleaning efficiency and the removal of highly contaminated liquid from the filter element.

The invention shall now be described with reference to embodiments and with reference to the attached Figures. In the embodiments, identical components are marked with the same reference signs.

Figure 2A:
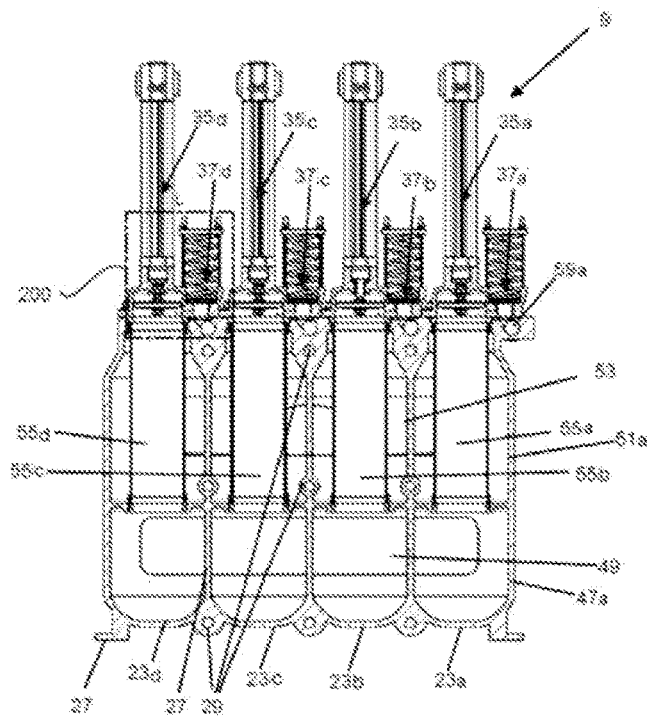
Figure 2B:
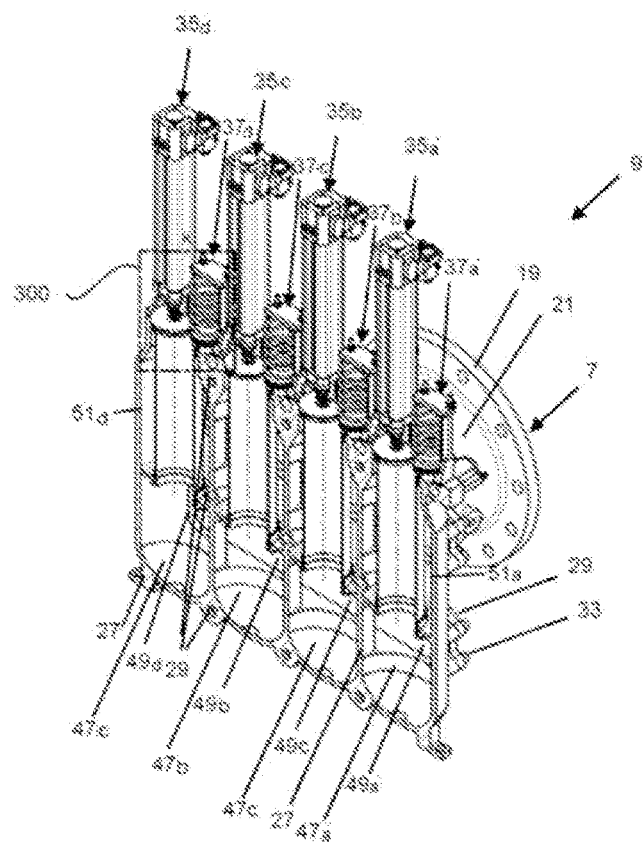
Figure 3:
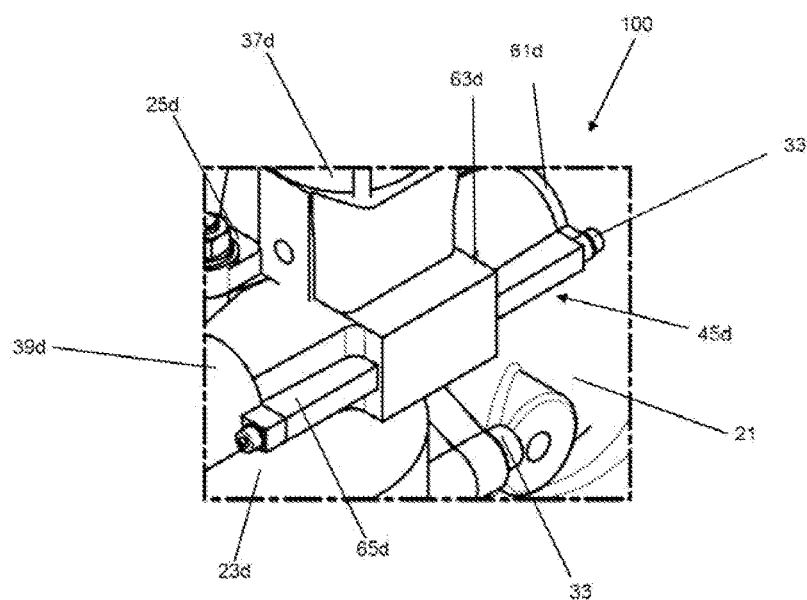
Figures 4A, 4B:
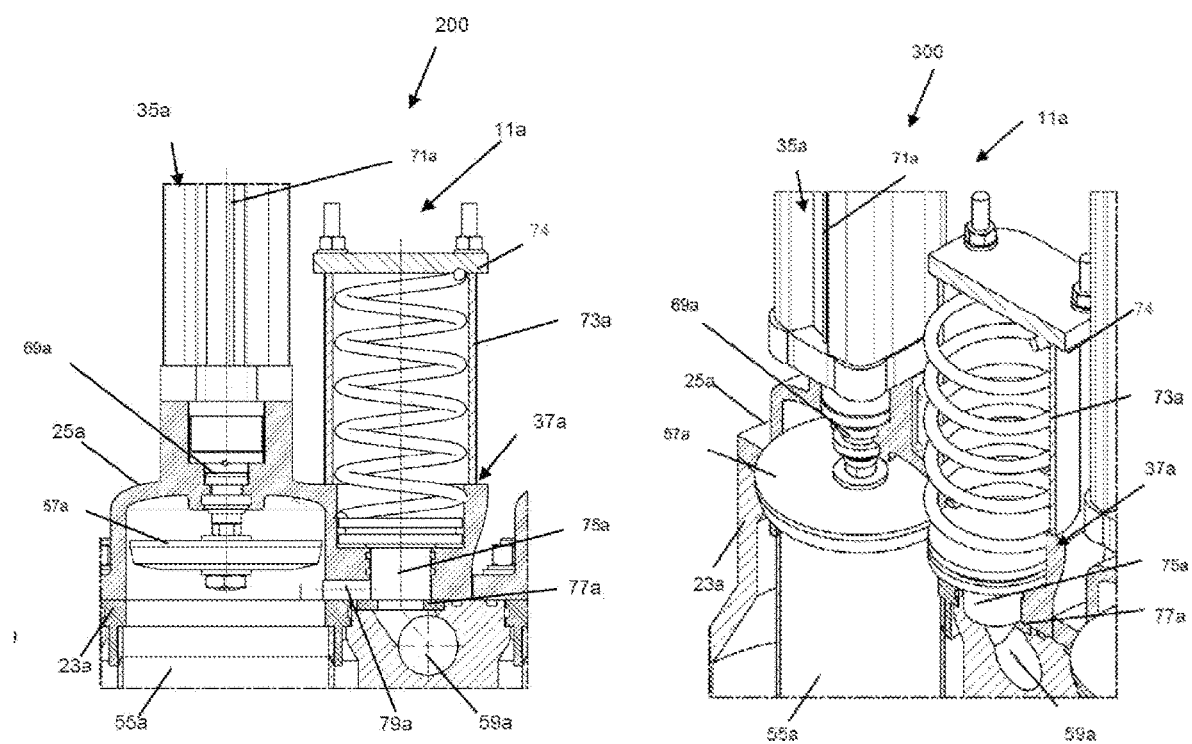
Figure 5:
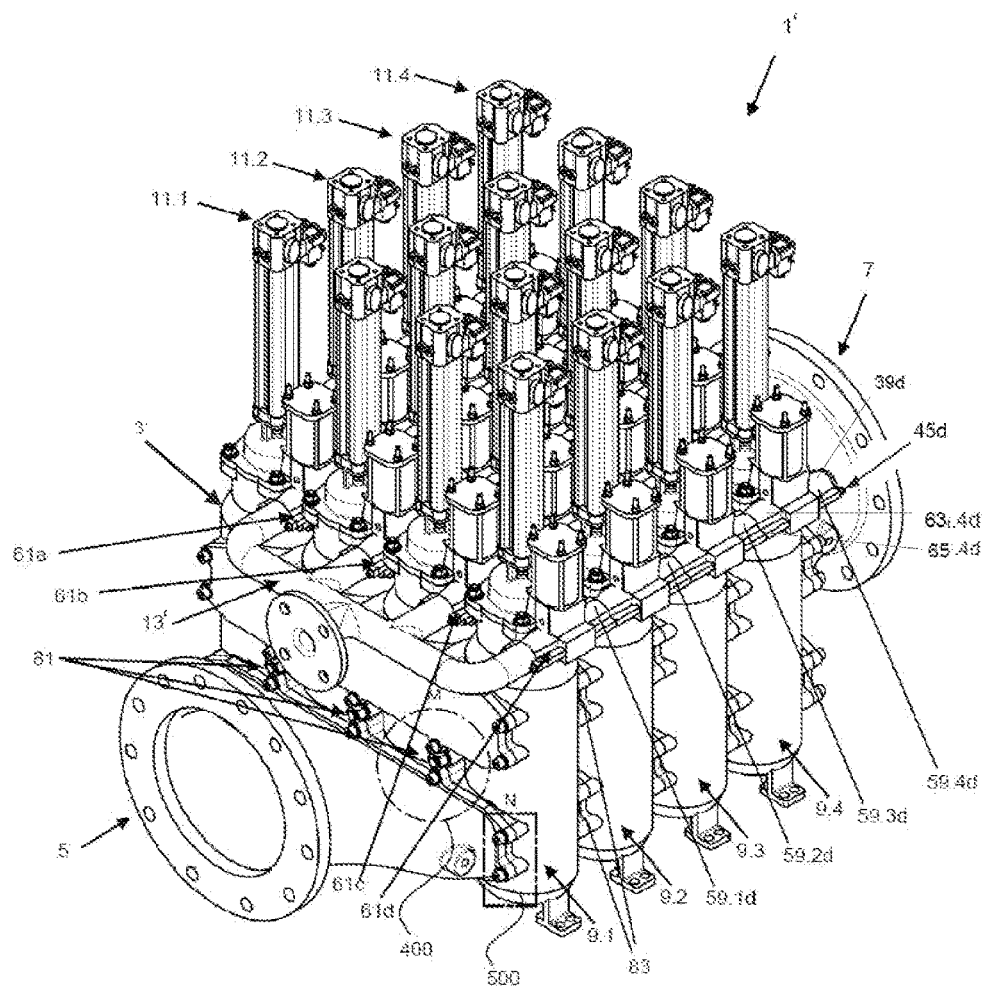
Figures 6, 7:
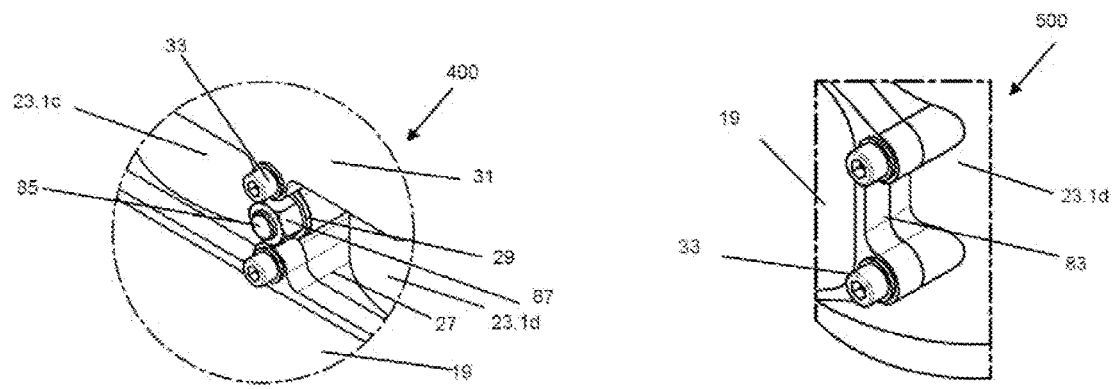
Figure 11:
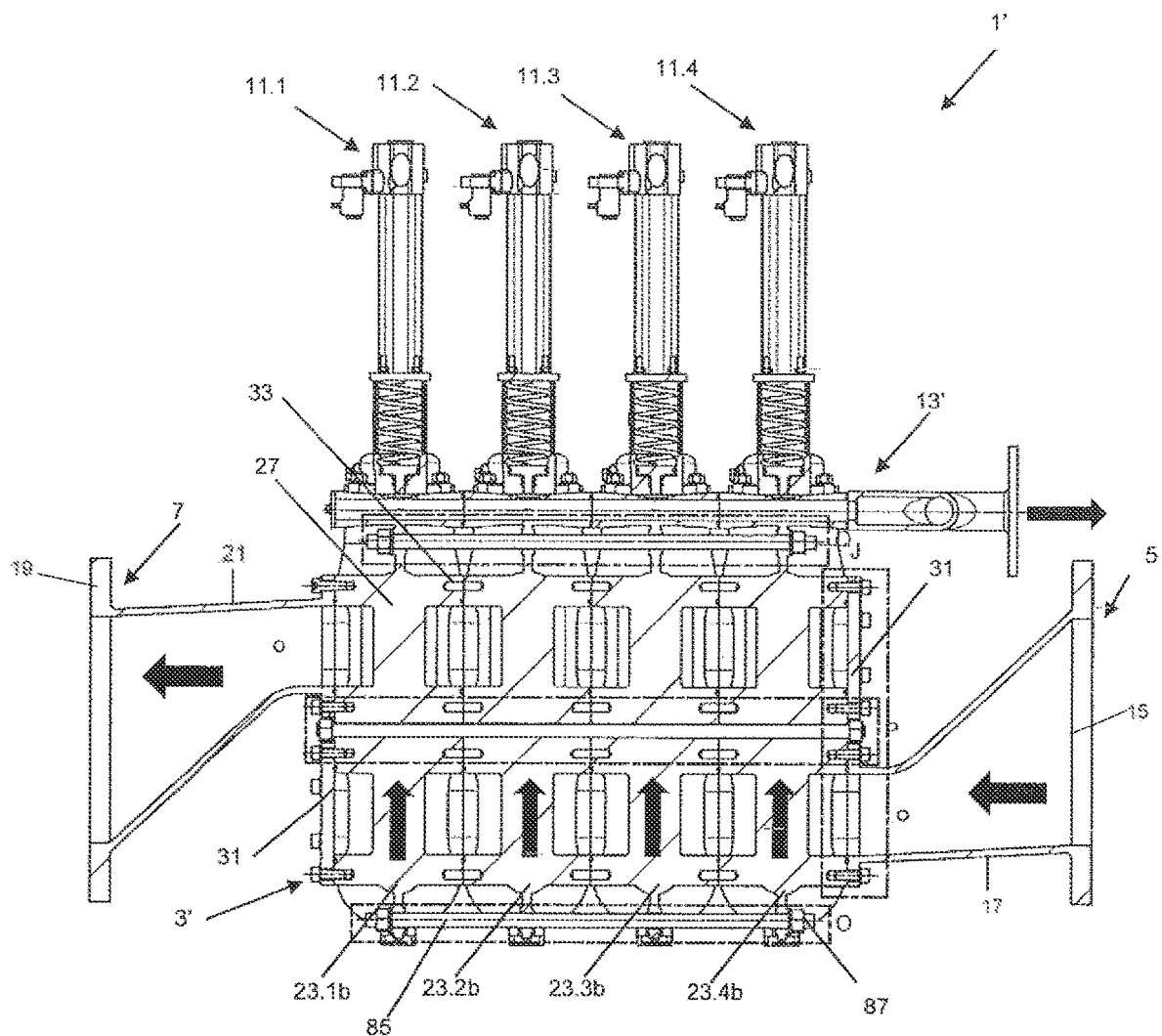

FIG. 1: shows a perspective view of an apparatus for filtering a fluid, according to a first embodiment;

FIG. 2*a*: shows a cross-sectional view of the apparatus in FIG. 1 for filtering a fluid, in a side view;

FIG. 2*b*: shows a cross-sectional view of the apparatus in FIG. 1 for filtering a fluid, in a perspective view;

FIG. 3: shows a detail of the apparatus shown in FIG. 1;

FIG. 4*a*: shows a detail of the cross-sectional view, shown in FIG. 2*a*, of the apparatus in FIG. 1;

FIG. 4*a*: shows a detail of the cross-sectional view, shown in FIG. 2*b*, of the apparatus in FIG. 1;

FIG. 5 shows a perspective view of an apparatus for filtering a fluid, accord to a second embodiment;

FIG. 6: shows a first detail of the apparatus shown in FIG. 5;

FIG. 7: shows a second detail of the apparatus shown in FIG. 5;

FIG. 8: shows a cross-sectional view of the apparatus in FIG. 5 for filtering a fluid, in a perspective view;

FIG. 9: shows a first detail of the cross-sectional view, shown in FIG. 8, of the apparatus in FIG. 5;

FIG. 10: shows a second detail of the cross-sectional view, shown in FIG. 8, of the apparatus in FIG. 5;

FIG. 11: shows a cross-sectional view of the apparatus in FIG. 5 for filtering a fluid, in a side view.

FIG. 1 shows a perspective view of an apparatus for filtering a fluid, according to a first preferred embodiment.

Apparatus 1 comprises a housing 3 having an inlet 5 for admitting the fluid to be filtered and an outlet 7 for discharging the filtered fluid from housing 3.

Housing 3 also includes a filter module 9 comprising four filter elements arranged in housing 3 for cleaning the liquid to be filtered.

Apparatus 1 further comprises at least one filter cleaning mechanism 11 each associated with a filter module 9 and adapted to clean filter module 9, in particular the filter elements arranged in filter module 9.

Housing 3 is also connected to a backflushing system 13 which is adapted to transport away and to discharge the residues which are removed from the filter elements by means of the filter cleaning mechanism 11.

Inlet 5 includes an inlet flange 15 for coupling to a pipeline for providing filtered fluid, and a pipe section 17 for attachment to the housing 3 of apparatus 1.

Inlet flange 15 has a first cross-sectional area that matches a pipeline. On the filter module side, pipe section 17 has a second cross-sectional area that matches housing 3. The center of the cross-sectional area on the pipeline side is spaced apart vertically from the center of the cross-sectional area on the housing side, i.e. below it, in particular.

Outlet 7 includes an outlet flange 19 for coupling to a pipeline for receiving the filtered fluid, and a pipe section 21 for connecting to housing 3.

Outlet flange 19 likewise has a cross-sectional area on the pipeline side, and a second cross-sectional area on the filter module side, which matches the opening in housing 3. The centers of the cross-sectional areas on the housing side and on the pipeline side are vertically spaced apart, the center of the cross-sectional area on the housing side being above the center of the cross-sectional area on the pipeline side.

Filter module 9 comprises four housing segments 23*a*, 23*b*, 23*c*, 23*d* arranged adjacently to one another. Housing segments 23*a*, 23*b*, 23*c*, 23*d* are arranged in a battery-like manner in relation to each other. Housing segments 23*a*, 23*b*, 23*c*, 23*d* are cylindrical, in sections, and are substantially identical to each other. Each of the housing segments 23*a*, 23*b*, 23*c*, 23*d* can be closed by means of a housing cover 25*a*, 25*b*, 25*c*, 25*d*. Housing cover 25*a*, 25*b*, 25*c* and 25*d* is connected to the respective housing segment 23*a*, 23*b*, 23*c* and 23*d* by connection means, which in this embodiment are provided in the form of bolts 33.

A supporting structure 27 is formed between the housing segments 23 of a filter module 9. Cylindrical recesses are formed in supporting structures 27.

Such a filter module 9 may be assembled from any number of interconnectable housing segments, including the filter elements arranged therein.

On the inlet side, an opening which is connectable to the inlet flange is formed in housing segments 23*a*, 23*b*, 23*c*, 23*d*. On the inlet side, housing segments 23*a*, 23*b*, 23*c*, 23*d* also have a second, common opening which can be closed by means of a seal member 31.

Seal member 31 can be connected by means of a plurality of connection means, in this embodiment by bolts 33, to housing segments 23*a*, 23*b*, 23*c*, 23*d*.

The filter cleaning mechanism 11 for cleaning filter module 9 comprises a plurality of filter cleaning elements, wherein each filter cleaning element is adapted to clean one of the filter elements arranged in housing segments 23*a*, 23*b*, 23*c*, 23*d*.

The filter cleaning mechanism 11 further comprises a number of lifting devices 35, corresponding to the number of filter cleaning elements, for driving the filter cleaning elements. By means of a controllable backflush valve 37, housing segments 23*a*, 23*b*, 23*c*, 23*d* can be connected to the backflushing system 13 and shut off from it.

Backflushing system 13 comprises a plurality of backflush pipes 39 which are coupled to a connecting pipe 41. Connecting pipe 41 connects backflush pipes 39 to a backflush outlet 43 which is adapted to discharge the highly contaminated fluid from housing 3.

Backflush pipes 39 are connected by means of pipe coupling unit 45 to housing segments 23a, 23b, 23c, 23d.

As can be seen from the cross-sectional view of the apparatus 1 in FIGS. 2a and 2b, filter module 9 comprises four housing segments 23a, 23b, 23c, 23d arranged adjacently and connected to one another. Supporting structures 27 which reinforce housing segments 23a, 23b, 23c, 23d are also formed between housing segments 23a, 23b, 23c, 23d. Three cylindrical, vertically spaced-apart recesses, which are designed so that assembly means or coupling means can be passed through them, are formed in supporting structures 27.

Housing segments 23a, 23b, 23c, 23d each have a bottom housing member 47a, 47b, 47c and 47d having a common fluid inlet 49 for fluid communication with inlet 5 and an upper housing member 51a, 51b, 51c and 51d having a common fluid outlet 53 for fluid communication with outlet 7. The bottom housing member 47a, 47b, 47c and 47d and the upper housing member 51a, 51b, 51c and 51d are spatially separated from each other. The contaminated fluid flows through inlet 5 into the bottom housing member 47a, 47b, 47c and 47d, which for that reason is also referred to as the "dirty side". The cleaned fluid flows through the upper housing member 51a, 51b, 51c and 51d to outlet 7, which for that reason is also referred to as the "clean side".

As shown in FIG. 2b, in particular, fluid inlet 49 is formed by the individual fluid inlets 49a, 49b, 49c and 49d in housing segments 23a, 23b, 23c, 23d, and fluid outlet 53 by the individual fluid outlets in housing segments 23a, 23b, 23c, 23d.

A filter element 55a, 55b, 55c and 55d is arranged in each of housing segments 23a, 23b, 23c, 23d. Housing segments 23a, 23b, 23c, 23d are cylindrical, in sections, and filter elements 55a, 55b, 55c and 55d, which have a substantially cylindrical cross-section, are arranged coaxially therewith.

The filter cleaning mechanism 11 for cleaning filter module 9 is coupled at least partially to housing cover 25a, 25b, 25c, 25d.

Lifting device 35a, 35b, 35c and 35d is securely connected to housing cover 25a, 25b, 25c, 25d, and backflush valves 37a, 37b, 37c and 37d are integrated at least partially in housing cover 25a, 25b, 25c, 25d.

The plurality of filter cleaning elements 57 (cf. FIGS. 4a and 4b) for cleaning the filters 55a, 55b, 55c and 55d of filter cleaning mechanism 11 is arranged in housing cover 25a, 25b, 25c, 25d and can be moved into the respective filter element 55a, 55b, 55c and 55d by means of a corresponding lifting device 35a, 35b, 35c and 35d.

Filter cleaning elements 57 are embodied as a disc of substantially round cross-section, the outer radius of filter cleaning element 57 being smaller than the inner radius of filter element 55a, 55b, 55c and 55d.

By means of controllable backflush valve 37a, 37b, 37c and 37d, housing segments 23a, 23b, 23c, 23d can to be connected to backflushing system 13, in particular to backflush pipes 39, and can be shut off therefrom.

As shown by FIG. 3, in particular, backflush pipes 39d, or a single pipe segment 59d of the backflushing system, can be closed fluid-tightly at their ends by means of a pipe cap 61d. The fluid being transported through backflushing system 13 can thus be discharged solely through backflush outlet 43.

Pipe coupling unit 45d comprises a plurality of pipe collars 63d, each of which surrounds a backflush pipe 39d or individual pipe segment 59d and connects it to housing segments 23d. Pipe collars 63d are designed so that coupling rods 65d can pass through them. Coupling rods 65d have at their ends engagement means 67 which are designed to be brought into engagement with pipe segments 59 of a backflush pipe 39d that are adjacent to coupling rods 65d.

Pipe cap 61d can also be connected to pipe coupling unit 45d and is connected by means thereof to backflushing system 13 and housing 3.

As shown by FIGS. 4a and 4b, each lifting device 35a has a lifting rod 69a which is coupled to filter cleaning element 57a, and an actuator 71a which is adapted to drive lifting rod 69a.

For each lifting rod 69a, an opening is provided in housing cover 25a for it to pass through.

When filter cleaning elements 57a are moved into filter element 55a by the lifting rod 69a driven by actuator 71a, the cross-sectional area of filter element 55a decreases. Due to this reduction in the cross-sectional area through which the fluid can flow, the flow velocity is significantly increased.

Residues are removed from filter elements 55a as a result of this increase in flow velocity. These residues are conducted through housing cover 25a, in particular through backflush pipe 59, into backflushing system 13.

Backflush valve 37a comprises a valve body 75a and a valve seat 77a with which valve body 75a can be brought into contact. Backflush valve 37a further comprises a restoring element 73a which is adapted to apply a restoring force to valve body 75a so that the latter is held in contact with valve seat 77a. Restoring element 73a is embodied as a spring and is arranged in a valve housing 74 integrated in the housing cover.

Valve body 75a is cylindrical, in sections, and is guided in a corresponding recess in housing cover 25a.

Valve seat 77a is embodied as an aperture which is designed to control the flow velocity of the fluid flowing into backflushing system 13. The flow velocity can thus be regulated according to the specific application by replacing the aperture.

A flow channel 79a which can be shut off by backflush valve 37a and which connects the upper housing member 51a (cf. FIG. 2b) and pipe segment 59a is provided in housing cover 25a.

Backflush valve 37a can preferably be controlled electropneumatically, such that valve body 75a is moved against the restoring force of restoring element 73a, when highly contaminated fluid has to be conducted out of the respective housing segment 23a into backflushing system 13 due to a cleaning operation performed by filter cleaning mechanism 11.

Filter cleaning mechanism 11 can thus receive a command via a control device to control lifting device 35a in such a way that cleaning disc 57a is moved into filter element 55a by lifting rod 69a, to which it is coupled and which is driven by actuator 71a. The residues in the filter element are flushed out of the latter due to the increase in flow velocity and transported into the upper housing member 51a of the respective housing segment 23a. As soon as backflush valve 37 is activated and valve body 75a moves against the restoring force exerted by restoring element 73a, flow channel 79a in housing covers 25a is released, through which the residues enter backflushing system 13.

For maintenance purposes, housing cover 25a and hence also those parts of filter cleaning mechanism 11 associated with it, can be easily dismantled using connection means 33.

The manner of operation of apparatus 1 according to the invention, as shown in FIGS. 1 to 4, shall now be described with reference to a practical example:

In a power station, for example, highly contaminated cooling water is conducted through pipelines to such an apparatus. The pipelines are connected in a fluid-tight manner to the inlet 5 of apparatus 1. The highly contaminated cooling water flows through inlet 5 into housing 3. Housing 3 has a plurality of housing segments 23a, 23b, 23c, 23d arranged adjacently to one another. In housing 3, the contaminated cooling water is distributed among housing segments 23a, 23b, 23c, 23d and flows from below into the filter elements, is cleaned by them and flows through the upper part of housing 3 before leaving the housing through outlet 7. Outlet 7 may be coupled to a pipeline that returns the cleaned cooling water to the cooling circuit.

If the filter elements in filter module 9 are highly contaminated, they are cleaned by filter cleaning mechanism 11. To that end, the filter elements are moved by means of lifting device 35 into housing segments 23a, 23b, 23c, 23d and result in an increase in the flow velocity due to the reduced cross-section inside the housing. Backflush valve 37 is already activated, subsequently or preferably, by operating lifting device 35 to connect housing 3 or the individual housing segments 23a, 23b, 23c, 23d fluidically to backflushing system 13 so that the residues are removed from apparatus 1 by backflushing system 13.

FIG. 5 shows a perspective view of an apparatus 1' for filtering a fluid, according to a second preferred embodiment.

Apparatus 1' comprises a housing 3' and an inlet 5 for admitting the fluid to be filtered into housing 3' and an outlet 7 for discharging the filtered fluid from housing 3'.

Housing 3' includes four filter modules 9.1, 9.2, 9.3, 9.4 arranged adjacent to one another between inlet 5 and outlet 7 and which are adapted to filter the admitted fluid by means of filter elements.

Apparatus 1' also includes four filter cleaning mechanisms 11 11.1, 11.2, 11.3, 11.4 that are each associated with a filter module 9.1, 9.2, 9.3, 9.4 and adapted to clean filter module 9.1, 9.2, 9.3, 9.4.

Housing 3' is also connected to a backflushing system 13' which is adapted to transport away and to discharge the residues which are removed from the filter elements by means of filter cleaning mechanisms 11.1, 11.2, 11.3, 11.4.

Inlet 5 includes an inlet flange 15 (cf. FIG. 1) for coupling to a pipeline, and a pipe section 17 (cf. FIG. 1) for attachment to housing 3', in particular to a filter module 9.1 on the inlet side of apparatus 1'.

Outlet 7 includes an outlet flange 19 (cf. FIG. 1) for coupling to a pipeline for receiving the filtered fluid, and a pipe section 21 (cf. FIG. 1) for connecting to housing 3', in particular to a filter module 9.4 on the outlet side.

Filter module 9.1 on the inlet side has a common fluid inlet 49 formed by the fluid inlets 49a, 49b, 49c, 49d (cf. FIG. 2b) of the individual housing segments.

Filter module 9.4 on the outlet side has a common fluid outlet 53 formed by the fluid outlets of the individual housing segments (cf. FIG. 2a).

Those fluid inlets 49 and fluid outlets 53 of the housing segments which are not connected to inlet 5 or outlet 7, respectively, form a through opening through which the inflowing fluid is distributed in housing 3' and flows into the filter elements in the housing segments.

Filter modules 9.1, 9.2, 9.3 and 9.4 are coupled to one another by means of a filter module coupling unit 81.

Filter module coupling unit 81 comprises a plurality of filter module coupling means 85 (cf. FIG. 6), which are embodied here as a rod with an external thread at its ends, and a plurality of fixing means 87 (cf. FIG. 6) which are embodied here as nuts. Nuts 87 can be brought into engagement with the external threads of coupling means 85.

The housing segments have receptacles 29 (cf. FIG. 6) for coupling means 85 that match coupling means 85.

Filter modules 9.1, 9.2, 9.3 and 9.4 are positioned, and fixed in their positions, by means of filter module coupling means 85, sealing means 83 being arranged between filter modules 9.1, 9.2, 9.3 and 9.4 so that filter modules 9.1, 9.2, 9.3 and 9.4 are coupled to each other in a fluid-tight manner.

The housing segments of a filter module 9.1, 9.2, 9.3 and 9.4 are arranged parallel to one another between inlet 5 and outlet 7, and filter modules 9.1, 9.2, 9.3 and 9.4 are arranged in series between inlet 5 and outlet 7, such that the fluid to be filtered flowing in through inlet 5 is distributed among the filter elements.

The filter cleaning mechanisms 11.1, 11.2, 11.3 and 11.4 for cleaning filter modules 9.1, 9.2, 9.3 and 9.4 comprise a plurality of filter cleaning elements, each filter cleaning element being adapted to clean one of the filter elements arranged in the housing segments.

Filter cleaning mechanisms 11.1, 11.2, 11.3 and 11.4 further comprise a number of lifting devices 35 (cf. FIG. 1) corresponding to the number of filter cleaning elements, for driving the filter cleaning elements. By means of a controllable backflush valve 37, housing segments 23 (cf. FIG. 1) can be connected to the backflushing system 13' and shut off from it.

Backflushing system 13' comprises a plurality of backflush pipes 39 which are coupled to a connecting pipe 41 (cf. FIG. 1). Connecting pipe 41 connects backflush pipes 39 to a backflush outlet 43 (cf. FIG. 1) which is adapted to discharge the highly contaminated fluid from housing 3'. Backflush pipes 39 can be closed fluid-tightly at their ends by means of a pipe cap 61.

Backflush pipes 39 comprise a plurality of pipe segments 59.1d, 59.2d, 59.3d, 59.4d which are each associated with a housing segment 23 (cf. FIG. 11).

Backflush pipes 39 each include at least one pipe segment 59.1d, 59.2d, 59.3d, 59.4d associated with a respective housing segment 23.

Each of pipe segments 59.1d, 59.2d, 59.3d, 59.4d preferably includes an outlet which can be shut off and through which the respective pipe segment 59.1d, 59.2d, 59.3d, 59.4d and housing segment 23 are in fluid communication with each other.

By means of the backflush valve (not shown), pipe segments 59.1d, 59.2d, 59.3d, 59.4d can be connected to housing segments 23 and shut off from them.

Backflushing system 13' is in fluid communication with housing 3' and adapted to transport residues removed from the filter elements of filter modules 9.1, 9.2, 9.3 and 9.4 by means of filter cleaning mechanism 11 and to remove them from apparatus 1'.

Apparatus 1' further comprises a pipe coupling unit 45d having a plurality of pipe collars which each surround a single pipe segment 59.1d, 59.2d, 59.3d, 59.4d and connect them to housing segments 23.1b, 23.2b, 23.3b, 23.4b. Pipe collar 63d is designed so that a coupling rod 65d can pass through it. At its ends, coupling rod 65d has engagement means (not shown) which are designed to be brought into engagement with coupling rods of adjacent pipe segments 59.1d, 59.2d, 59.3d, 59.4d of a backflush pipe 39d. A plurality of pipe segments 59.1d, 59.2d, 59.3d, 59.4d can thus be combined to form a backflush pipe 39d.

As shown by FIG. 6, in particular, coupling means 85 can be passed through receptacles 29 formed in the supporting structures 27 of housing segments 23.

Bolts 33 are disposed above and below the coupling means 85 having the fixing means 87 at their ends, the lower bolt being designed to connect seal member 31 to housing 3', and the bolts below coupling means 85 and fixing means 87 being designed to connect pipe section 17 of inlet 5 to housing 3'. Recesses into which bolts 33 can be introduced and with which they can be brought into engagement, in particular, are provided for this purpose in supporting structures 27.

As shown by FIG. 7, in particular, further bolts 33 for connecting pipe section 17 to housing 3' at the periphery of the outer housing segments 23.1*c* and 23.1*d* can be brought into engagement with the latter.

FIG. 8 shows a cross-sectional view of the apparatus 1' in FIG. 5, in a perspective view. Filter modules 9.1, 9.2, 9.3, and 9.4, which are arranged between inlet 5 and outlet 7, are connected to one another by means of filter module coupling unit 81.

Filter module coupling means 85 are guided through receptacles 29 in the supporting structures 27 formed between housing segments 23.

Three vertically spaced-apart filter module coupling means 85 are arranged between two adjacent housing segments 23 of a filter module 9.

Recesses which can be brought into engagement with bolts 33 are formed above and below receptacles 29. Bolts 33 are designed to connect the sealing means 83 provided between adjacent housing segments 23 coupled to one another to housing segments 23.

As shown by FIG. 9, in particular, receptacles 29 are substantially cylindrical, so that the coupling means embodied as a rod with a circular cross-section can be passed through them. The recesses for bolts 33 are arranged in pairs adjacent to receptacles 29.

As shown by FIG. 10, in particular, the fixing means 87 provided at the ends and which can be brought into engagement with coupling means 85 are locknuts. Threads with which connection means 33 for attaching pipe sections 17, 21 of inlet 5 and of inlet 7 and seal member 31 can be brought into engagement are also provided in the supporting structures 27 of housing segments 23.

FIG. 11 shows a cross-sectional view of the apparatus 1' according to the invention for filtering a fluid.

As can be seen from this cross-sectional view, in particular, inlet 5 with inlet flange 15 and pipe section 17 (cf. FIG. 1), and outlet 7 with outlet flange 19 and pipe section 21 (cf. FIG. 1) are embodied in identical form. The cross-sectional area at inlet flange 15, and in particular the center of this cross-sectional area, is vertically spaced apart from the center of the cross-sectional area of pipe section 17 on the housing side. Pipe section 17 thus tapers towards housing 3'. The same applies to pipe section 21 of outlet 7.

Due to the asymmetric design of inlet 5 and outlet 7, the fluid to be filtered can flow from a predefined height of the pipeline into the lower part of housing 3', distribute itself in housing 3' and flow into the filter elements arranged in the upper housing member. Due to the vertical offset, the apparatus according to the invention thus operates "inline", which means that the apparatus can be installed in an existing pipe system, for example between two spaced-apart pipe sections at the same height.

The manner of operation of apparatus 1' according to the invention, as shown in FIGS. 5 to 11, shall now be described with reference to a practical example:

In a power station, for example, highly contaminated cooling water is conducted through pipelines to such an apparatus. The pipelines are connected in a fluid-tight manner to the inlet 5 of apparatus 1'. The highly contaminated cooling water flows through inlet 5 into housing 3'. Housing 3' has a plurality housing segments 23 which are preferably arranged adjacent to one another. In housing 3', the contaminated cooling water flows into at least one filter element, each of which is arranged at least partially inside a housing segment 23 of housing 3'. Housing segments 23, in each of which a filter element is arranged, together form a first filter module 9.1. Such a filter module 9 may be assembled from any number of housing segments, including the filter elements arranged therein. The contaminated cooling water can flow through and be cleaned in a plurality of filter modules 9.1, 9.2, 9.3 and 9.4 connected in series, before it leaves housing 3' through outlet 7. Outlet 7 may be coupled to a pipeline that returns the cleaned cooling water to the cooling circuit.

If the filter elements of filter modules 9.1, 9.2, 9.3 and 9.4 are contaminated too heavily, a filter cleaning mechanism 11.1, 11.2, 11.3 and 11.4 which cleans the filter elements in housing segments 23 is assigned to each of the filter modules.

LIST OF REFERENCE SIGNS

1 Apparatus (1, 1')
3 Housing (3, 3')
5 Inlet
7 Outlet
9 Filter module (9.1, 9.2, 9.3, 9.4)
11 Filter cleaning mechanism (11.1, 11.2, 11.3, 11.4)
13 Backflushing system (13, 13')
15 Inlet flange
17 Pipe section
19 Outlet flange
21 Pipe section
23 Housing segment (23*a*, 23*b*, 23*c*, 23*d*; 23.1*c*, 23.1*d*, 23.1*b*, 23.2*b*, 23.3*b*, 23.4*b*)
25 Housing cover (25*a*, 25*b*, 25*c*, 25*d*)
27 Supporting structure
29 Receptacles
31 Seal member
33 Bolt
35 Lifting device (35*a*, 35*b*, 35*c*, 35*d*)
37 Backflush valve (37*a*, 37*b*, 37*c*, 37*d*)
39 Backflush pipe (39*d*)
41 Connecting pipe
43 Backflush outlet
45 Pipe coupling unit (45*d*)
47 Bottom housing member (47*a*, 47*b*, 47*c*, 47*d*)
49 Fluid inlet (49*a*, 49*b*, 49*c*, 49*d*)
51 Upper housing member (51*a*, 51*b*, 51*c*, 51*d*)
53 Fluid outlet
55 Filter element (55*a*, 55*b*, 55*c*, 55*d*)
57 Filter cleaning elements (57*a*)
59 Pipe segment (59*d*; 59.1*d*, 59.2*d*, 59.3*d*, 59.4*d*)
61 Pipe cap (61*d*)
63 Pipe collar (63*d*)
65 Coupling rod (65*d*)
67 Engagement means
69 Lifting rod (69*a*, 69*b*, 69*c*, 69*d*)
71 Actuator (71*a*, 71*b*, 71*c*, 71*d*)
73 Restoring element (73*a*, 73*b*, 73*c*, 73*d*)
74 Valve housing
75 Valve body (75*a*, 75*b*, 75*c*, 75*d*)
77 Valve seat (77*a*, 77*b*, 77*c*, 77*d*)
79 Flow channel (79*a*, 79*b*, 79*c*, 79*d*)
81 Filter module coupling unit
83 Sealing means
85 Filter module coupling means
87 Fixing means

The invention claimed is:

1. An apparatus (1, 1') for filtering a fluid, comprising:
a housing (3, 3'),
one or more filter elements (55), arranged in the housing (3, 3'), for filtering the fluid,
an inlet (5) for admitting fluid to be filtered into the housing (3, 3'),
an outlet (7) for discharging the filtered fluid from the housing (3, 3'),
a backflush valve (37), and
a filter cleaning mechanism (11) for cleaning the filter element(s) (55) of residues from the filtered fluid, comprising:
at least one movably mounted filter cleaning element (57) which is embodied to match a respective filter element (55) and is adapted to clean the filter element (55) of residues from the filtered fluid, the at least one filter cleaning element (57) being inserted within the one or more filter elements (55),
a backflushing system (13, 13') in fluid communication with the filter element(s) (55), for conducting and discharging the residues from the filtered fluid,
wherein the housing (3, 3') has a plurality of housing segments (23) which can be connected to adjacent housing segments (23), and
wherein a filter element (55) is arranged at least partially inside each housing segment (23), and
wherein the housing segments (23) and filter elements (55) together form a modularly assembled filter module (9),
wherein the backflush valve (37) has a valve housing (74), which is formed by a housing cover (25), and a valve body (73) which can be brought into contact with a valve seat (77) in order to close the valve is movably mounted on the valve housing (74), and
wherein a flow channel adapted to connect the filter element (55) fluidically with a backflush pipe (39) is formed in the housing cover (25), and the valve body (73) shuts off the flow channel when the valve is closed.

2. The apparatus (1, 1') according to claim 1,
characterized in that a plurality of filter modules (9) are arranged adjacent to one another, are connected in series, and a filter module (9) is fluidically connectable to at least one adjacent filter module (9).

3. The apparatus (1, 1') according to claim 1,
characterized in that a plurality of filter modules (9) are arranged in a row between an inlet (5) and an outlet (7) in such a way that the housing segments (23) of the filter modules (9) are arranged as a battery, wherein the housing segments (23) are the same or identical in design.

4. The apparatus (1, 1') according to claim 1,
characterized in that the housing segments (23) each have at least one fluid inlet (49) for admitting the fluid to be filtered and at least one fluid outlet (53) for discharging the filtered fluid,
wherein each of the fluid inlets (49) is fluidically connectable to a fluid outlet (53) of an adjacent filter module (9) or to the outlet (7), and
in that each of the fluid inlets (49) can be fluidically connected to a fluid inlet (49) of an adjacent filter module (9) or to the inlet (5), and/or has at least one through opening which is adapted to distribute the fluid to be filtered within the filter module (9).

5. The apparatus (1, 1') according to claim 4,
characterized by at least one seal member (31) for sealing the ends of the housing segments (23) of a filter module (9) arranged on the inlet side and/or the outlet side,
wherein the seal member (31) is adapted to seal the fluid inlet (49) or the fluid outlet (53) of a housing segment (23), respectively.

6. The apparatus (1, 1') according to claim 1,
characterized by a filter module coupling unit (81) for fixing and coupling two or more filter modules (9), comprising:
at least one coupling means (85) which is adapted to couple adjacently arranged filter modules (9) to one another, and
at least one fixing means associated with the coupling means (85), which fixing means is adapted to fix the adjacently arranged filter modules (9) in their positions.

7. The apparatus (1, 1') according to claim 6,
characterized in that at least one coupling means is associated with each housing segment (23), which coupling means can be brought into engagement at their ends with the fixing means (85), wherein the coupling means (85) are designed as rods, and
wherein the housing segments (23) have receptacles for the coupling means (85), which are embodied to match the coupling means and which are embodied as receptacles through which the rods are guided.

8. The apparatus (1, 1') according to claim 1,
characterized in that the inlet (5) includes an inlet flange (15) for connecting to a pipeline and a pipe section (17) on the inlet side for connecting to the housing (3, 3'), and
in that the outlet (7) includes an outlet flange (19) for connecting to a pipeline and a pipe section (21) on the outlet side for connecting to the housing (3, 3'), wherein the pipe sections (17, 21) each have a first cross-sectional area on the filter module side and a second cross-sectional area on the flange side, and
the center of the cross-sectional area on the flange side is spaced apart vertically and/or horizontally from the center of the cross-sectional area on the filter module side.

9. The apparatus (1, 1') according to claim 8,
characterized in that the distance between the center of the cross-sectional area on the flange side and the cross-sectional area on the filter module side can be changed in the vertical and/or horizontal direction by rotation about a horizontal axis.

10. The apparatus (1, 1') according to claim 1,
characterized by a lifting device (35) comprising an actuator (71) and a lifting rod (69) coupled to the filter cleaning element, wherein the lifting device (35) is adapted to introduce the filter cleaning element (57) into the filter element (55) by means of the lifting rod (69) in such a way that a cleaning gap is formed between an inner wall of the filter element (55) and the filter cleaning element (57), so that a flow velocity of the liquid to be filtered is locally increased and substances in the filter element (55) are flushed off.

11. The apparatus (1, 1') according to claim 10,
characterized in that the backflushing system (13, 13') further comprises:
a backflush outlet (43) for discharging the residues from the filtered fluid,
a plurality of backflush pipes (39) for fluidically connecting adjacent filter modules (9), wherein the backflush pipes (39) are spaced apart and arranged parallel to one another and each have at least one pipe segment (59) which can be shut off and which is connected to a housing segment (23) of the filter modules (9), a connecting pipe (41) for fluidically connecting the backflush pipes (39) to each other and to the backflush outlet.

12. The apparatus (1, 1') according to claim 1, wherein:
the filter cleaning mechanism (11) is associated with the housing cover (25) and fixed thereto, and the backflushing system (13, 13') is associated with the housing (3, 3') and the housing segments (23) thereof.

13. The apparatus (1, 1') according to claim 11, wherein:
the backflushing system further comprises a plurality of backflush pipes for fluidically connecting adjacent filter modules (9), the backflush pipes (39) each have at least one pipe segment (59) having an outlet (7) which can be shut off, said pipe segment being in fluid communication with the filter element (55), and characterized in that the filter cleaning mechanism (11) is associated with the housing cover (25) and is fixed thereto, and the backflushing system (13, 13') is associated with the housing (3, 3') and with housing segments (23) thereof, wherein the backflush valve (37) adapted to shut off the backflush pipes (39) at least in sections is integrated in the housing cover (25).

14. The apparatus (1, 1') according to claim 1, wherein:
the backflushing system further comprises a plurality of backflush pipes for fluidically connecting adjacent filter modules (9), the backflush pipes (39) each have at least one pipe segment (59) having an outlet (7) which can be shut off, said pipe segment being in fluid communication with the filter element (55), and characterized in that the filter cleaning mechanism (11) is associated with the housing cover (25) and is fixed thereto, and the backflushing system (13, 13') is associated with the housing (3, 3') and with housing segments (23) thereof, wherein the backflush valve (37) adapted to shut off the backflush pipes (39) at least in sections is integrated in the housing cover (25).

15. The apparatus (1, 1') according to claim 13, wherein:
the filter cleaning element (57) is integrated in the housing cover (25).

16. The apparatus (1, 1') according to claim 15,
characterized in that the filter cleaning mechanism (13, 13') further comprises:

a lifting device (35) comprising an actuator (71) and a lifting rod (69) coupled to the filter cleaning element (57), wherein the lifting device (35) is adapted to introduce the filter cleaning element (57) into the filter element (55) by means of the lifting rod (69) in such a way that a cleaning gap is formed between an inner wall of the filter element (55) and the filter cleaning element (57), so that a flow velocity of the liquid to be filtered is locally increased and substances in the filter element (55) are flushed off, and wherein the lifting device (35) is associated with the housing cover (25) and the actuator (71) and is securely connected to the housing cover (25), and an opening is provided in the housing cover (25) for the lifting rod (69) to pass through.

17. The apparatus (1, 1') according to claim 1,
characterized in that the valve seat (77) is embodied as an aperture which is adapted to change the velocity of the volumetric flow which flows into the backflush pipe (39).

18. The apparatus (1, 1') according to claim 1, wherein the at least one filter cleaning element (57) comprises a disc.

19. The apparatus (1, 1') according to claim 1, wherein the at least one filter cleaning element (57) comprises an outer radius that is smaller than an inner radius of the one or more filter elements (55) in which it is inserted.

\* \* \* \* \*